United States Patent
Sato et al.

(10) Patent No.: US 10,611,374 B2
(45) Date of Patent: Apr. 7, 2020

(54) DRIVE CONTROL METHOD AND DRIVE CONTROL APPARATUS

(71) Applicant: Nissan Motor Co., Ltd., Yokohama-shi, Kanagawa (JP)

(72) Inventors: Ko Sato, Kanagawa (JP); Masahiro Kobayashi, Kanagawa (JP); Yasuhisa Taira, Kanagawa (JP); Osamu Fukata, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/315,304

(22) PCT Filed: Jun. 7, 2017

(86) PCT No.: PCT/JP2017/021050
§ 371 (c)(1),
(2) Date: Jan. 4, 2019

(87) PCT Pub. No.: WO2018/008321
PCT Pub. Date: Jan. 11, 2018

(65) Prior Publication Data
US 2019/0308623 A1    Oct. 10, 2019

(30) Foreign Application Priority Data
Jul. 6, 2016   (JP) ................. 2016-134042

(51) Int. Cl.
*B60W 30/12*    (2020.01)
*B60W 40/06*    (2012.01)
(Continued)

(52) U.S. Cl.
CPC ............. *B60W 30/12* (2013.01); *B60R 21/00* (2013.01); *B60W 30/10* (2013.01); *B60W 40/06* (2013.01);
(Continued)

(58) Field of Classification Search
CPC .. B60W 30/12; B60W 40/06; B60W 2550/14; B60W 2720/24; G06K 9/00798
(Continued)

(56) References Cited

U.S. PATENT DOCUMENTS 8,346,427 B2    1/2013  Kobayashi
8,798,841 B1*   8/2014  Nickolaou ......... B62D 15/0265
                                                           701/23
(Continued)

FOREIGN PATENT DOCUMENTS

EP    1653310 A2    5/2006
JP    2007164636 A  6/2007
(Continued)

*Primary Examiner* — Thomas G Black
*Assistant Examiner* — Wae L Louie
(74) *Attorney, Agent, or Firm* — Young Basile Hanlon & MacFarlane, P.C.

(57) ABSTRACT

A drive control method controls a drive control amount of a subject vehicle so that the subject vehicle may take a prescribed position with respect to lane markings of a lane in which the subject vehicle is running and reduces a drive control amount adopted when a lateral position of one of the lane markings along which the subject vehicle is running moves in a different direction from a lateral position of the other lane marking smaller than a drive control amount adopted when lateral positions of both the lane markings move in the same direction.

4 Claims, 5 Drawing Sheets

(51) Int. Cl.
    *G06K 9/00*         (2006.01)
    *B60W 30/10*       (2006.01)
    *B60R 21/00*       (2006.01)
    *G05D 1/02*        (2020.01)

(52) U.S. Cl.
    CPC ..... *G06K 9/00798* (2013.01); *B60W 2550/14* (2013.01); *B60W 2720/24* (2013.01); *B60Y 2200/10* (2013.01); *B60Y 2300/12* (2013.01); *G05D 1/0246* (2013.01); *G05D 2201/0213* (2013.01)

(58) Field of Classification Search
    USPC .......................................................... 701/41
    See application file for complete search history.

(56) References Cited

U.S. PATENT DOCUMENTS

| | | | |
|---|---|---|---|
| 2011/0010021 A1* | 1/2011 | Kobayashi | B60T 8/17557 701/1 |
| 2015/0248588 A1* | 9/2015 | Ishigami | G06K 9/00798 382/104 |
| 2016/0176358 A1* | 6/2016 | Raghu | G06K 9/00798 382/104 |
| 2016/0214612 A1* | 7/2016 | Kashiba | B60W 10/184 |
| 2019/0092323 A1* | 3/2019 | Viehmann | B60W 30/09 |
| 2019/0248368 A1* | 8/2019 | Kurata | G08G 1/166 |

FOREIGN PATENT DOCUMENTS

| | | | |
|---|---|---|---|
| JP | 2009214786 A | 9/2009 | |
| JP | 2014210456 A | 11/2014 | |
| JP | 2015191445 A | 11/2015 | |

\* cited by examiner

DRIVE CONTROL METHOD AND DRIVE CONTROL APPARATUS

CROSS-REFERENCE TO RELATED APPLICATION

The present application claims priority to Japanese Patent Application No. 2016-134042 filed Jul. 6, 2016, incorporated herein in its entirety.

TECHNICAL FIELD

The present invention relates to a drive control method and a drive control apparatus.

BACKGROUND

It has been known that there is a vehicle driving assist apparatus that recognizes a driving zone from left and right lane markings arranged along a road on which a vehicle is running and controls at least one of the steering and braking of the vehicle so that the vehicle may run without deviating from the driving zone (refer to Japanese Unexamined Patent Application Publication No. 2009-214786). If a space between the lane markings widens to an extent improper to define the driving zone, Japanese Unexamined Patent Application Publication No. 2009-214786 sets, as a reference, one of the left and right lane markings that extends along a planned driving road of the vehicle and recognizes a virtual driving zone (driving zone).

Lane keep control is used not only for keeping a driving zone but also, in some cases, for maintaining a prescribed position, for example, a central position with respect to lane markings of a lane. In such a case, a change in a space between the lane markings results in changing the prescribed position with respect to the lane markings of the lane. If a space between lane markings changes and if the lane keep control is carried out with a regular control amount, a lateral position of the subject vehicle will be destabilized to give a driver an odd feeling.

SUMMARY

In consideration of the above-mentioned problem, an object of the present invention is to provide a drive control method and a drive control apparatus that reduce an odd feeling given to a driver when a lane width changes.

According to an aspect of the present invention, the drive control method controls a drive control amount of a subject vehicle so that the subject vehicle may take a prescribed position with respect to lane markings of a lane in which the subject vehicle is running and reduces a drive control amount adopted when a lateral position of one of the lane markings along which the subject vehicle is running moves in a different direction from a lateral position of the other lane marking smaller than a drive control amount adopted when lateral positions of both the lane markings move in the same direction.

The present invention is able to provide the drive control method and drive control apparatus that reduce an odd feeling given to a driver when a lane width changes.

DETAILED DESCRIPTION

With reference to the drawings, an embodiment of the present invention will be explained. The drawings describe the same parts with the same reference marks to omit explanation.

Figure 1:
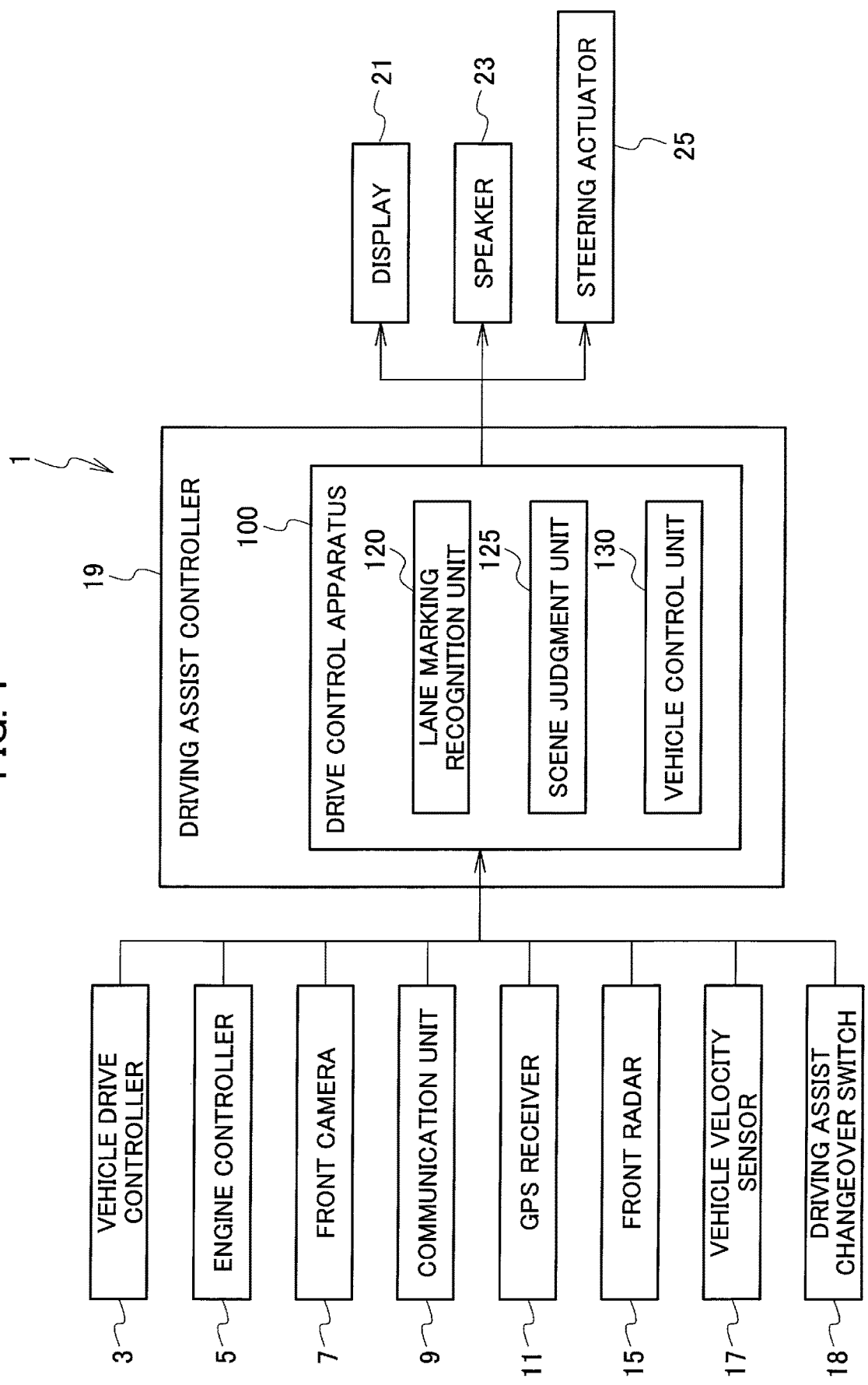
FIG. 1 is a block diagram illustrating a configuration of a drive control system 1 according to an embodiment of the present invention.

With reference to FIG. 1, a configuration of a drive control system 1 according to an embodiment of the present invention will be explained. The drive control system 1 includes a vehicle drive controller 3, an engine controller 5, a front camera 7, a communication unit 9, a GPS receiver 11, a front radar 15, a vehicle velocity sensor 17, and a driving assist changeover switch 18. Further, the drive control system 1 includes a driving assist controller 19, a display 21, a speaker 23, and a steering actuator 25. The drive control system 1 is mounted on a subject vehicle and the subject vehicle is provided with a system such as active cruise control that controls the subject vehicle so as to follow a preceding vehicle in front of the subject vehicle.

The vehicle drive controller 3 includes systems configured to control the driving of the vehicle such as an antilock brake system, a traction control system, and vehicle dynamics control. The engine controller 5 is a controller to control an engine. The front camera 7 photographs ahead of the subject vehicle and obtains an image in which a preceding vehicle is photographed. The image photographed with the front camera 7 is used to obtain information such as a vehicle-to-vehicle distance and relative velocity with respect to the preceding vehicle and a lateral position of the preceding vehicle with respect to the subject vehicle or a lane marking. The communication unit 9 sends and receives information communication services with the use of road-to-vehicle communication and cellular network of mobile phone. The GPS receiver 11 receives information of the latitude, longitude, and altitude of the subject vehicle from a satellite. The front radar 15 uses millimeter waves to measure a vehicle-to-vehicle distance and relative velocity between the preceding vehicle and the subject vehicle. The vehicle velocity sensor 17 measures a vehicle velocity of the subject vehicle. The driving assist changeover switch 18 is a switch to change an automated driving mode that controls the driving of the subject vehicle so that the subject vehicle keeps a prescribed position with respect to lane markings of a lane in which the subject vehicle is running and a manual driving mode that does not control the driving of the subject vehicle from one to another. The switch 18 is operated by a driver of the subject vehicle.

The driving assist controller 19 controls a driving assist system and an automated driving system, such as adaptive cruise control, emergency braking, and auto-hold braking. It is also possible to employ a system that adds a steering control function to the adaptive cruise control. The driving assist controller 19 employs the front camera 7, front radar 15, and the like to detect whether or not there is a preceding vehicle, lane markings (lane detection), a vehicle-to-vehicle distance, and a lateral position of a preceding vehicle with respect to the subject vehicle or lane markings and sends instructions to the engine controller 5 or the steering actuator 25, thereby controlling the driving of the subject vehicle, including acceleration, deceleration, and steering. If there is no preceding vehicle, the driving assist controller 19 conducts vehicle velocity control to run by keeping a constant speed, and if there is a preceding vehicle, vehicle distance maintaining control to run by keeping a constant vehicle-to-vehicle distance with respect to the preceding vehicle. If the preceding vehicle stops, the subject vehicle also stops and conducts stop-and-hold control.

The display 21 displays system states of the adaptive cruise control, emergency braking, auto-hold braking, and the like. The speaker 23 voices and displays information and alarms provided by the adaptive cruise control, emergency braking, auto-hold braking, and the like. The steering actuator 25 responds to instructions from the driving assist controller 19 and a drive control apparatus 100, to conduct a steering operation for controlling a lateral position of the subject vehicle.

The drive control apparatus 100 is a controller integrated with the driving assist controller 19 and is installed in the subject vehicle. The drive control apparatus 100 recognizes a lane in which the subject vehicle is running and controls the driving of the subject vehicle so that the subject vehicle may take a prescribed position (e.g., a central position between left and right lane markings) with respect to the lane markings of the lane. More precisely, the drive control apparatus 100 controls at least one of the steering and braking of the vehicle to bring a lateral position of the subject vehicle to a prescribed position with respect to the lane markings of the lane. Hereunder, explanation is continued in connection with an example that the drive control apparatus 100 transmits a control signal to the steering actuator 25 to control the steering of the vehicle.

The drive control apparatus 100 is able to switch the automated driving mode to control the driving of the subject vehicle and the manual driving mode not to control the driving of the subject vehicle from one to another. Whenever the switch 18 is operated, the drive control apparatus 100 changes the automated driving mode and manual driving mode from one to another. A switching trigger is not limited to the operation of the switch 18. For example, if the driver interferes the automated driving in the automated driving mode, the drive control apparatus 100 changes the mode to the manual driving mode.

The drive control apparatus 100 is, e.g. a general-purpose microcomputer having a CPU (Central Processing Unit), a memory, and an input/output unit. A computer program (drive control program) to function the microcomputer as the drive control apparatus 100 is installed in the microcomputer and is executed therein. With this, the general-purpose microcomputer functions as the drive control apparatus 100. In here, the drive control apparatus 100 is realized by, as an example, software. Naturally, it is possible to prepare exclusive hardware for executing information processes mentioned below to constitute the drive control apparatus 100. A plurality of units (120, 125, 130) included in the drive control apparatus 100 may be constituted with individual hardware pieces. Also, not only the drive control apparatus 100 but also each of the vehicle drive controller 3, engine controller 5, and driving assist controller 19 may similarly be realized by software or exclusive hardware.

Further, the drive control apparatus 100 may also be used as an electronic control unit (ECU) for conducting other control tasks of the vehicle.

The drive control apparatus 100 has, as functional components, the lane marking recognition unit (lane marking recognition circuit) 120, scene judgment unit (scene judgment circuit) 125, and vehicle control unit (vehicle control circuit) 130. The functional components (120, 125, 130) operate in the automated driving mode and do not operate in the manual driving mode.

The lane marking recognition unit 120 recognizes, from an image obtained by the camera 7, a left and right pair of lane markings that define a lane (subject lane) in which the subject vehicle is running.

Figure 3:
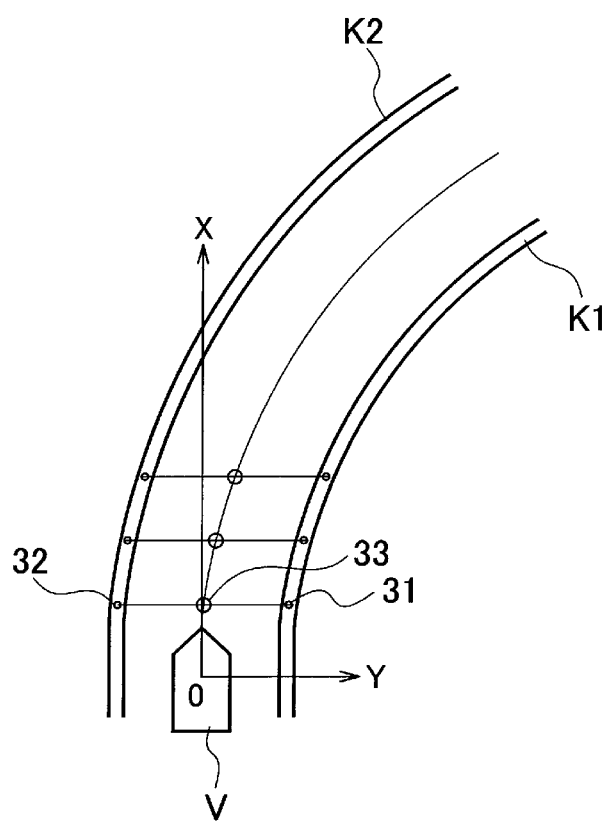
FIG. 3 is a top view illustrating a scene of a first example that a lane ahead of a subject vehicle V curves rightward.

The scene judgment unit 125 computes a lateral position (offset amount) of each lane marking with respect to the subject vehicle and monitors a change in the lateral position (offset amount). According to the change in the lateral position (offset amount), it judges a state (scene) of the lane. For example, the scene judgment unit 125 sets, as illustrated in FIG. 3, two-dimensional coordinates with the subject vehicle V being a center, a running direction of the subject vehicle V being an X-axis, and a vehicle width direction of the subject vehicle V being a Y-axis. Here, the running direction of the subject vehicle V is set as a positive direction of the X-axis and a rightward vehicle width direction of the subject vehicle V as a positive direction of the Y-axis. Then, X- and Y-coordinates are obtained on recognized spots (31, 32) of the respective lane markings recognized by the lane marking recognition unit 120. The scene judgment unit 125 is able to recognize Y-coordinates of the recognized spots (31, 32) as lateral positions of the respective lane markings with respect to the subject vehicle.

Thereafter, the scene judgment unit is able to monitor, according to changes in Y-coordinates along X-coordinates of the recognized spots (31, 32), changes in the lateral positions (offset amounts) of the lane markings. As a first example, FIG. 3 illustrates a lane that curves rightward ahead of the subject vehicle V. Namely, a left and right pair of lane markings that define the lane curve to the right. In this case, lateral positions of both the lane markings move in the same direction (right direction in FIG. 3). Accordingly, if the Y-coordinates (lateral positions) of the recognized spots (31, 32) change in the same direction (incremental direction or decremental direction), the scene judgment unit 125 is able to recognize, as illustrated in FIG. 3, the scene (first example) that the lane ahead of the subject vehicle V curves rightward or leftward.

Figure 4:
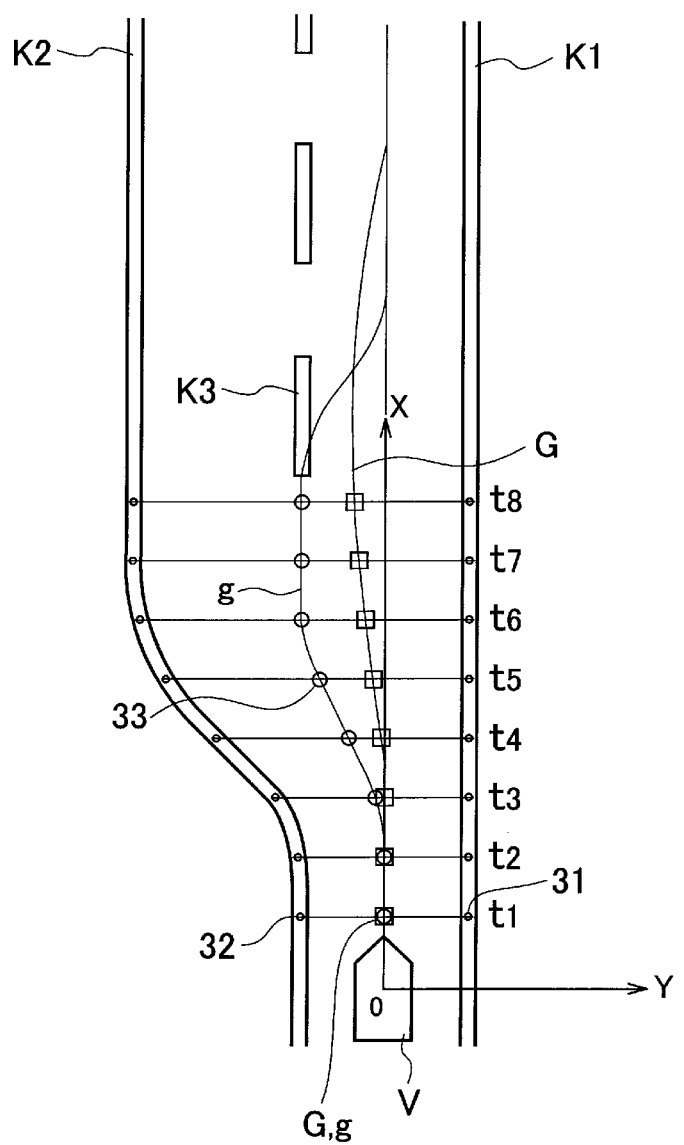
FIG. 4 is a top view illustrating a scene of a second example that a lane width ahead of the subject vehicle V widens.
Figure 5A:
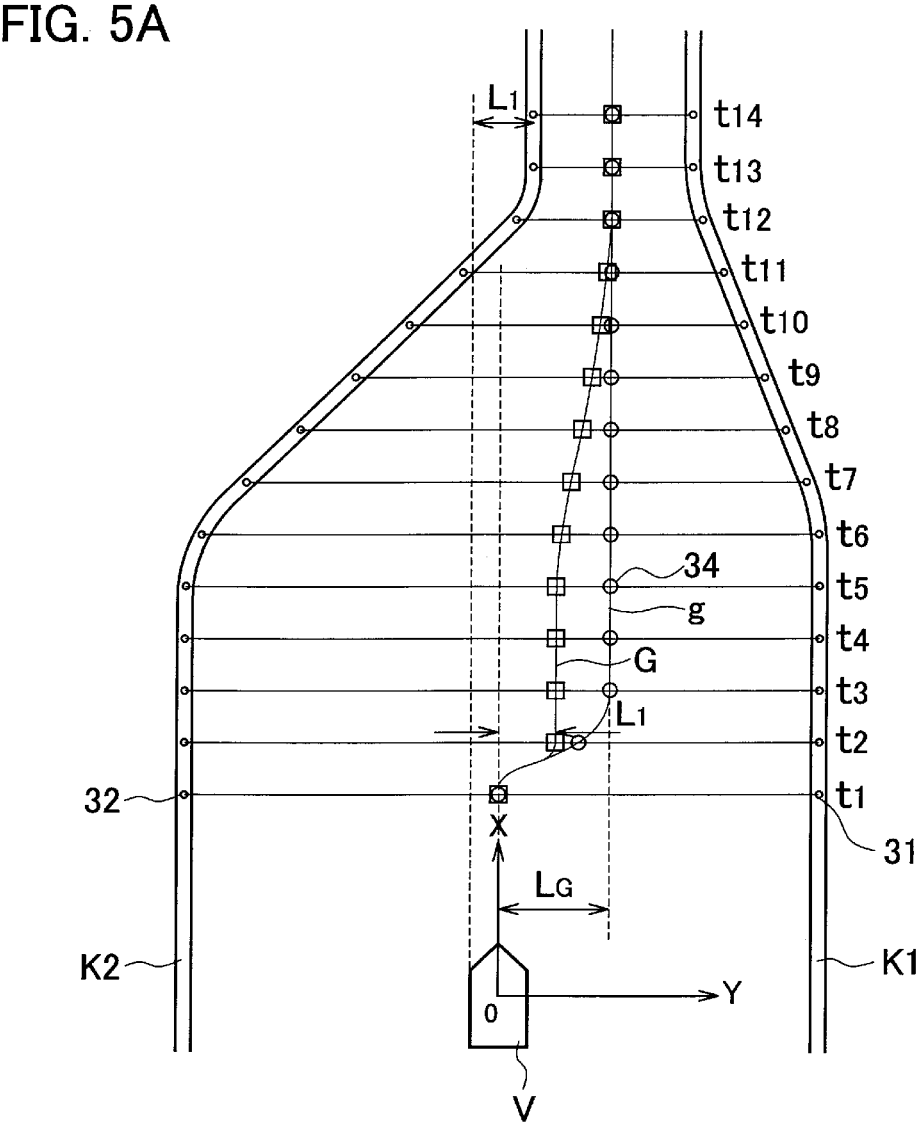
FIG. 5A is a top view illustrating a scene of a third example that a lane width ahead of the subject vehicle V narrows.

Second and third examples are illustrated in FIGS. 4 and 5A in which a lane width ahead of the subject vehicle V widens or narrows. In this case, a lateral position of at least one of a left and right pair of lane markings moves inward or outward. The scene judgment unit 125 monitors that absolute values of Y-coordinates of at least one of recognized spots (31, 32) increase or decrease.

In more detail, according to the second example illustrated in FIG. 4, a lane width ahead of the subject vehicle V widens. This is a scene to be seen in front of a fork, for example, an exit fork from a highway, an entrance fork to a tollbooth of a highway, or a left- or right-turn fork in the vicinity of an intersection. In such a scene, one (K2) of a left and right pair of lane markings (K1, K2) that define a lane moves outward and the other (right 31) does not move or move also outward. Accordingly, if Y-coordinate (lateral position) absolute values of at least one of the recognized spots (31, 32) show an increase and those of the other show no change, the scene judgment unit 125 recognizes, as illustrated in FIG. 4, the scene (second example) that a lane width ahead of the subject vehicle V widens.

According to the third example illustrated in FIG. 5A, a lane width ahead of the subject vehicle V narrows. This is a scene to be seen in front of a junction where the number of lanes decreases, for example, around an exit from a tollbooth of a highway, or around an entrance to a highway. In such a scene, one (K2) of a left and right pair of lane markings (K1, K2) that define a lane moves inward and the other shows no change or also moves inward. Accordingly, if Y-coordinate (lateral position) absolute values of at least one of the recognized spots (31, 32) show a decrease and those of the other show no change, the scene judgment unit 125 recognizes, as illustrated in FIG. 5A, the scene (third example) that a lane width ahead of the subject vehicle V narrows.

In this way, the scene judgment unit 125 is able to discriminate at least the three scenes illustrated in FIGS. 3 to 5A from one another according to changes in Y-coordinates (lateral positions) of spots (31, 32) on lane markings recognized by the lane marking recognition unit 120.

In the example explained above, the scene judgment unit 125 discriminates three scenes from one another. Not only this, but it may discriminate the first example from a scene inclusive of the second and third examples. Namely, the scene judgment unit 125 identifies, if the lateral positions of both lane markings move in the same direction, the scene (first example) that a lane curves rightward or leftward, and if the lateral position of at least one of the lane markings moves, the scene (inclusive of the second and third examples) that a lane width changes.

The vehicle control unit 130 controls the running of the subject vehicle based on running state information of the subject vehicle and the scene determined by the scene judgment unit 125, so that the lateral position of the subject vehicle with respect to a lane marking may take a prescribed position. First, based on the running state information of the subject vehicle, it computes a steering angle target value required for bringing the lateral position of the subject vehicle relative to a lane marking to a prescribed position. The vehicle control unit 130 computes a steering torque target value to make an actual steering angle agree with the steering angle target value. The technique of controlling the steering of a vehicle to bring the lateral position of the subject vehicle with respect to a lane marking to a prescribed position is known, and therefore, the description of such a controlling technique will be omitted here. The vehicle control unit 130 adjusts a gain value by which the steering torque target value is multiplied, thereby adjusting steering torque actually outputted from the steering actuator 25. Namely, the vehicle control unit 130 adjusts, with the gain value, a ratio of actual steering torque to the steering torque target value. The larger the gain value is increased, the nearer the actual steering torque approaches the steering torque target value, to increase a steering control amount as a value necessary for controlling the subject vehicle to a prescribed lateral position with respect to a lane marking. As a result, the larger the gain value is increased, the steeper the steering control is carried out, to move the lateral position of the subject vehicle to the prescribed position in a short time.

The vehicle control unit 130 changes the gain value according to the scene determined by the scene judgment unit 125, thereby changing the steering control amount. In more detail, the vehicle control unit 130 reduces a steering control amount adopted when the lateral position of at least one of lane markings moves inward or outward (when the lateral position of one lane marking along which the subject vehicle is running moves in a different direction with respect to the lateral position of the other lane marking, for example, when the vehicle is running on a straight road whose lane width expands or narrows) smaller than a steering control amount adopted when the lateral positions of both lane markings move in the same direction (for example, when the vehicle is running in a curved lane whose width shows no change, or expands, or narrows). With this, a steering control amount adopted when a lane width changing scene (including the second and third examples) is identified is able to be reduced smaller than a steering control amount adopted when a lane curving scene (the first example) is identified. The steering control amount adopted when the lateral positions of both lane markings move in the same direction is defined as a "regular control amount" and the steering control amount when the lateral position of at least one of lane markings moves inward or outward is defined as a "gradual control amount". The "gradual control amount" does not include a control amount of zero.

When a lane curves as illustrated in FIG. 3, the regular control amount is adopted to conduct lane keep control. Namely, with respect to lane markings (K1, K2) of the lane, the steering of the subject vehicle is controlled so that the subject vehicle may keep a prescribed position (for example, a central position 33 between the lane markings). However, in front of an exit or a tollbooth of a highway, or in the vicinity of an entrance to a right-turn lane of a general road, a lane width widens or narrows. According to a change in the lane width, the prescribed position (central position 33 between lane markings) of the subject vehicle with respect to the lane markings (K1, K2) changes.

For example, if the lane width widens leftward as illustrated in FIG. 4, the central position 33 between recognized spots (31, 32) of the respective lane markings greatly moves leftward. According to the change in the lane width, if the "regular control amount" is adopted to conduct the lane keep control, the vehicle will run on a drive path (g) passing through the central position 33 of the recognized spots (31, 32). According to the example of FIG. 4, the vehicle follows a right lane after the lane branches so that, just after the recognition of a new lane marking K3, the central position 33 between the lane markings greatly swings rightward and the drive path (g) follows it. In this way, when a lane width widens leftward, carrying out the control with the "regular control amount" increases a moving amount of the subject vehicle V in the vehicle width direction (Y-axis direction), to destabilize the lateral position of the subject vehicle V and give the driver an odd feeling.

To cope with this, the drive control amount (gradual control amount) adopted when the lateral position of one of a pair of lane markings (K1, K2) positioned on the right and left of the subject vehicle V moves is set to be smaller than the drive control amount (regular control amount) adopted when the lateral positions of both of a pair of lane markings (K1, K2) move in the same direction. This results in reducing a steering control amount adopted when a space between lane markings (K1, K2) of a lane changes. As a result, the subject vehicle V runs along, for example, a drive path (G) to reduce a moving amount of the subject vehicle V in the vehicle width direction (Y-axis direction), stabilize the lateral position of the subject vehicle V, and decrease an odd feeling given to the driver. Also, when a lane width ahead of the subject vehicle V narrows as illustrated in FIG. 5A, a drive control amount is similarly reduced to decrease an odd feeling given to the driver.

When a lane width ahead of the subject vehicle V narrows as illustrated in FIG. 5A, the steering of the subject vehicle is controlled before the lane width narrows so that the lateral position of the subject vehicle V may take a prescribed position (central position 34 of lane markings) with respect to lane markings (K1, K2) in a narrowed state (t14). For example, the drive control apparatus 100 recognizes at time t1 the lane markings (K1, K2) in the narrowed state (t14) and identifies a scene (third example) that the lane width ahead of the subject vehicle V narrows. In this case, if the "regular control amount" is adopted to carry out control, the lateral position of the subject vehicle V will move a distance (LG), as illustrated with a drive path (g), to a central position (34) of the lane markings in the narrowed state (t14) within a short period from time t1 to t3. This increases a moving velocity of the subject vehicle V in the lane width direction (Y-axis direction) and gives the driver an odd feeling.

To cope with this, the drive control apparatus 100 reduces the drive control amount (gradual control amount) adopted when the lateral position of one of a pair of lane markings (K1, K2) positioned on the left and right of the subject vehicle V moves smaller than the drive control amount (regular control amount) adopted when the lateral positions of both of a pair of lane markings (K1, K2) move in the same direction. This results in reducing a steering control amount adopted when a space between lane markings (K1, K2) of a lane changes. As a result, the subject vehicle V runs along, for example, a drive path (G) illustrated in FIG. 5A, the moving velocity of the subject vehicle V in the vehicle width direction (Y-axis direction) slows, the lateral position of the subject vehicle V stabilizes, and the odd feeling given to the driver decreases.

When a lane width ahead of the subject vehicle V narrows as illustrated in FIG. 5A, the vehicle control unit 130 determines, based on the running state information of the subject vehicle V, whether or not the subject vehicle deviates from the lane if the subject vehicle V maintains the present running state. Namely, it determines whether or not a planned driving path of the subject vehicle V estimated from the steering state or yaw rate state of the subject vehicle V deviates outside the left and right pair of lane markings (K1, K2) recognized by the lane marking recognition unit 120. If it is determined that the subject vehicle V deviates from the lane, the vehicle control unit 130 employs the "regular control amount" to execute steering control so that the subject vehicle V may not deviate from the lane. After carrying out the steering control to keep the subject vehicle V within the lane, the steering control amount is set to the "gradual control amount". Namely, if the lateral position of at least one of a pair of lane markings (K1, K2) moves inward, a control amount necessary for not deviating the subject vehicle V from the lane is made larger than a steering control amount to be adopted thereafter.

Figure 5B:
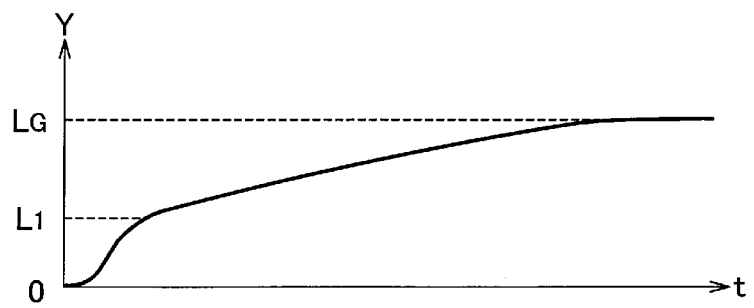
FIG. 5B is a graph illustrating a Y-coordinate temporal change of the subject vehicle V along a drive path G of FIG. 5A.

For example, as illustrated in FIGS. 5A and 5B, the vehicle control unit 130 carries out, between time t1 and t2, steering control necessary for not deviating the subject vehicle from the lane with the "regular control amount". With this, in a short period from time t1 to t2, the lateral position (Y-coordinate) of the subject vehicle V is able to move a distance (L1) that is required not to deviate the subject vehicle V outside the left lane marking (K2). Thereafter, i.e., after time t2, the vehicle control unit 130 carries out the lane keep control with the "gradual control amount" so that the subject vehicle V may take a prescribed position (central position 34) with respect to the lane markings (K1, K2) in the narrowed state (t14). As a result, the subject vehicle V is able to run along the drive path (G) illustrated in FIG. 5A.

In this way, the steering control amount not to deviate from a lane can be increased and the steering amount adopted thereafter can be decreased. This results in avoiding a deviation from a lane and reducing an odd feeling given to a driver.

Figure 2:
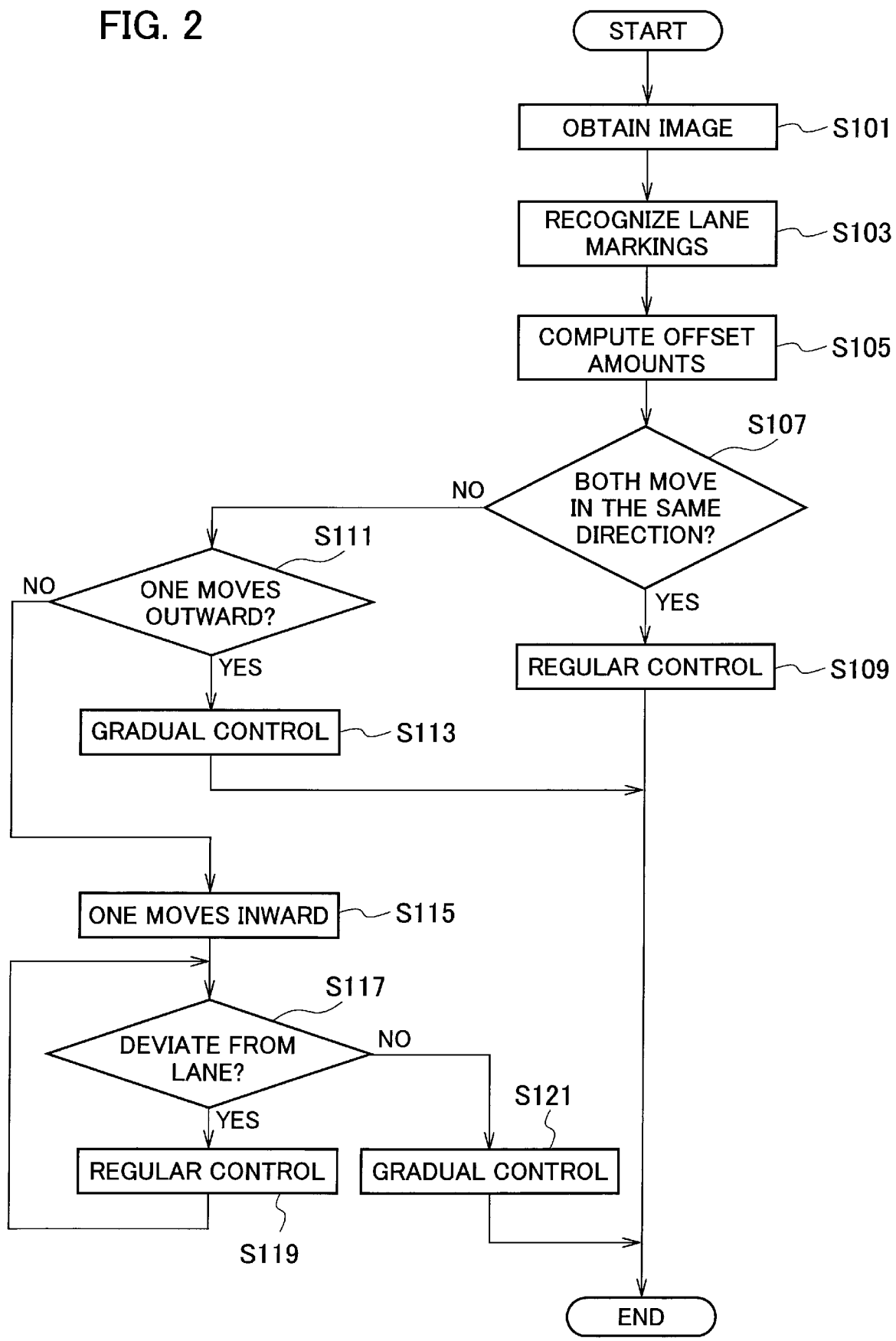
FIG. 2 is a flowchart illustrating an example of a processing operation of the drive control system of FIG. 1.

With reference to FIG. 2, an example of a processing operation (drive control method) of the drive control system 1 of FIG. 1 will be explained. A flowchart of FIG. 2 starts when the subject vehicle is changed from the manual driving mode to the automated driving mode and is repeatedly executed until the automated driving mode is changed to the manual driving mode.

In step S101, the front camera 7 photographs ahead of the subject vehicle V and obtains an image in which lane markings are picked up. The process goes to step S103 in which the lane marking recognition unit 120 recognizes, from the image obtained by the camera 7, a left and right pair of lane markings that define a lane in which the subject vehicle V is running.

The process goes to step S105 in which the scene judgment unit 125 computes a lateral position (offset amount) of each lane marking with respect to the subject vehicle and monitors a change in the lateral position (offset amount). Thereafter, the scene judgment unit 125 judges a state (scene) of the lane according to the change in the lateral position (offset amount). At first, the process goes to step S107 in which the scene judgment unit 125 judges whether or not the lane ahead of the subject vehicle V curves rightward or leftward. More precisely, as illustrated in FIG. 3, it judges whether or not Y-coordinates (lateral positions) of recognized spots (31, 32) change in the same direction (incremental direction or decremental direction).

If it is judged that the lane ahead of the subject vehicle V curves (YES in step S107), the process goes to step S109 in which the vehicle control unit 130 executes the lane keep control with the "regular control amount". Namely, as illustrated in FIG. 3, it controls the steering of the subject vehicle V with the "regular control amount" so that the lateral position of the subject vehicle V takes a prescribed position (a central position 33 of the lane markings) with respect to the lane markings (K1, K2) recognized in step S103. More precisely, the vehicle control unit 130 sets a ratio (gain value) of actual steering torque to a steering torque target value to be greater than a predetermined reference value.

On the other hand, if it is judged that the lane ahead of the subject vehicle V is not curving (NO in step S107), the process goes to step S111 in which the scene judgment unit 125 judges whether or not a lane width ahead of the subject vehicle V widens. More precisely, as illustrated in FIG. 4, it judges whether or not at least one (K2) of the left and right lane markings (K1, K2) that define the lane moves outward.

If it is judged that the lane width ahead of the subject vehicle V widens (YES in step S111), step S113 is carried out in which the vehicle control unit 130 executes the lane keep control with the "gradual control amount". More precisely, the vehicle control unit 130 sets a ratio (gain value) of actual steering torque to the steering torque target value to be smaller than the predetermined reference value. As a result, as illustrated in FIG. 4, the subject vehicle V runs along a drive path (G). In this way, the vehicle control unit 130 reduces the drive control amount adopted when a lane width widens smaller than the drive control amount (regular control amount) when a lane curves.

On the other hand, if it is judged that the lane width ahead of the subject vehicle V does not widen (NO in step S111), step S115 is carried out in which the scene judgment unit 125 judges that the lane width ahead of the subject vehicle V narrows. Namely, as illustrated in FIG. 5A, at least one (K2) of the left and right pair of lane markings (K1, K2) that define the lane moves inward.

The process goes to step S117 in which the vehicle control unit 130 refers to running state information of the subject vehicle V and judges whether or not the subject vehicle V deviates from the lane if the running states (acceleration/deceleration state and steering state) of the subject vehicle V are maintained. If it is judged that the subject vehicle V deviates from the lane (YES in step S117), the process goes to step S119 in which the vehicle control unit 130 executes, with the "regular control amount", steering control necessary for not deviating the subject vehicle V from the lane.

After the steering control necessary for not deviating the subject vehicle V from the lane is executed (NO in step S117), the process goes to step S121 in which the vehicle control unit 130 executes the lane keep control with the "gradual control amount" that is smaller than the "regular control amount". In this way, if the lateral position of at least one of the pair of lane markings (K1, K2) moves inward, the control amount required for not deviating the subject vehicle V from the lane is increased larger than the steering control amount that is adopted thereafter.

As explained above, the embodiment provides the below-mentioned effects.

If a lane curves, the vehicle control unit 130 carries out the lane keep control with the regular control amount. However, in front of an exit or a tollbooth of a highway, or in the vicinity of an entrance to a right-turn lane of a general road, a space between lane markings, i.e., a lane width will widen or narrow. The change in the lane width results in changing a predetermined position (central position 33) of the subject vehicle V with respect to lane markings (K1, K2). If the lane keep control is executed with the regular control amount in response to the change in the lane width, a lateral position of the subject vehicle V will become unstable to give the driver an odd feeling. To cope with this, the drive control amount (gradual control amount) adopted when the lateral position of at least one of a pair of lane markings that are positioned on the left and right of the subject vehicle V moves inward or outward (FIGS. 4 and 5A) is decreased smaller than the drive control amount (regular control amount) adopted when the lateral positions of both of a pair of lane markings move in the same direction (FIG. 3). With this, a drive control amount adopted when a space between lane markings of a lane changes (FIGS. 4 and 5A) becomes smaller than the regular control amount. As a result, a moving quantity or a moving velocity of the subject vehicle V in the lane width direction decreases to stabilize the lateral position of the subject vehicle V and reduce an odd feeling given to the driver.

If it is judged that the lateral position of at least one of lane markings moves inward and that the subject vehicle deviates from a lane, control not to deviate the subject vehicle from the lane is carried out with a control amount that is greater than the gradual control amount. Thereafter, control is carried out with the gradual control amount. In other words, if the lateral position of at least one of a pair of lane markings moves inward, a control amount necessary for not deviating the subject vehicle from a lane is increased larger than a drive control amount to be adopted thereafter (S115 to S121). This avoids deviation from a lane and reduces an odd feeling given to the driver.

Although the present invention has been explained on the basis of embodiment, it should not be understood that the explanation and drawings that form part of the disclosure limit the present invention. The disclosure may clarify, for persons skilled in the art, various substitutes, alternatives, and applications for the present invention.

Although the drive control apparatus 100 controls vehicle steering as an example of drive control, the present invention is not limited to this. For example, instead of the vehicle steering, or in addition to the vehicle steering, it may independently control the braking force of left and right tires. For example, applying a braking force only to a right/left tire can turn the subject vehicle to the right/left.

The functions mentioned in the above embodiments can be materialized with one or more processing circuits. The processing circuits include programmed processing units such as electric-circuit-containing processing units. The processing units include application specific integrated circuits (ASICs) arranged to execute the functions mentioned in the embodiments and conventional circuit parts.

DESCRIPTION OF REFERENCE NUMERALS

25: Steering actuator
100: Drive control apparatus
120: Lane marking recognition unit (Lane marking recognition circuit)
125: Scene judgment unit
130: Vehicle control unit (Vehicle control circuit)
V: Subject vehicle
K1, K2: Lane marking

The invention claimed is:

1. A drive control method comprising recognizing lane markings of a lane in which a subject vehicle is running and controlling a drive control amount of the subject vehicle so that the subject vehicle may take a prescribed position with respect to the lane markings of the lane, characterized in that:
a judging unit configured to judge if a lateral position of one of the lane markings along which the subject vehicle is running moves in a different direction from a lateral position of the other lane marking is equipped; and
when it is judged that a lateral position of one of the lane markings along which the subject vehicle is running moves in a different direction from a lateral position of the other lane marking, the drive control amount is reduced smaller than when lateral positions of both the lane markings move in the same direction.

2. The drive control method as set forth in claim 1, characterized in that, if it is judged that a lateral position of at least one of the lane markings moves inward and the subject vehicle deviates from the lane, control not to deviate the subject vehicle from the lane is conducted with a control amount larger than the drive control amount, and thereafter, control is conducted with the drive control amount.

3. The drive control method as set forth in claim 1, characterized in that, if it is judged that a lateral position of at least one of the lane markings moves inward, controls not to deviate the subject vehicle from the lane is conducted with a control amount larger than the drive control amount, and thereafter, control is conducted with the drive control amount.

4. A drive control apparatus comprising:
a lane marking recognition circuit to recognize lane markings of a lane in which a subject vehicle is running;
a judging unit to decide if a lateral position of one of the lane markings along which the subject vehicle is running moves in a different direction from a lateral position of the other lane marking; and a vehicle control circuit to control a drive control amount of the subject vehicle so that the subject vehicle may take a prescribed position with respect to the lane markings recognized by the lane marking recognition circuit, characterized in that:

when it is judged that a lateral position of one of the lane markings along which the subject vehicle is running moves in a different direction from a lateral position of the other lane marking, the vehicle control circuit reduces the drive control amount smaller than when lateral positions of both the lane markings move in the same direction.

* * * * *